United States Patent
Ikeda

(10) Patent No.: US 9,223,957 B2
(45) Date of Patent: Dec. 29, 2015

(54) IMAGE FORMING APPARATUS, IMAGE PROCESSING APPARATUS AND IMAGE DELIVERY SYSTEM

(75) Inventor: Yasuyuki Ikeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 742 days.

(21) Appl. No.: 12/805,288

(22) Filed: Jul. 22, 2010

(65) Prior Publication Data

US 2011/0023102 A1    Jan. 27, 2011

(30) Foreign Application Priority Data

Jul. 27, 2009  (JP) ................... 2009-174612

(51) Int. Cl.
| | |
|---|---|
| G06F 21/00 | (2013.01) |
| G06F 21/40 | (2013.01) |
| G06F 21/31 | (2013.01) |
| H04L 29/06 | (2006.01) |

(52) U.S. Cl.
CPC ................ *G06F 21/40* (2013.01); *G06F 21/31* (2013.01); *H04L 63/08* (2013.01)

(58) Field of Classification Search
CPC .......... H04L 63/08; G06F 21/31; G06F 21/40
USPC ....................................................... 726/7, 2
See application file for complete search history.

(56) References Cited

U.S. PATENT DOCUMENTS

2006/0064738 A1* 3/2006 Hino et al. ........................ 726/2
2007/0124799 A1* 5/2007 Osamura et al. .................. 726/2
2008/0189775 A1 8/2008 Fujita
2008/0256459 A1 10/2008 Sekiya (Continued)

FOREIGN PATENT DOCUMENTS

| CN | 1976384 | 6/2007 |
|---|---|---|
| CN | 101287052 | 10/2008 |
| CN | 101360104 | 2/2009 |

(Continued)

OTHER PUBLICATIONS

Chinese Office Action dated Sep. 29, 2012, issued in Chinese Application No. 201010236598.6 and English translation thereof.

(Continued)

*Primary Examiner* — Brandon Hoffman
*Assistant Examiner* — Thong Truong
(74) *Attorney, Agent, or Firm* — Harness, Dickey & Pierce, P.L.C.

(57) ABSTRACT

An image forming apparatus connected to plural authentication servers includes an acquiring unit configured to acquire user identifying information identifying a user and a password; a selecting unit configured to select server identifying information identifying two or more of the plural authentication servers; an authentication process unit configured to transmit the user identifying information and the password to the two or more authentication servers identified by the selected server identifying information, and acquire an authentication result from the two or more authentication servers. The authentication process unit determines that authentication is successful upon reception of the authentication result indicating successful authentication by at least one of the two or more authentication servers. The image forming apparatus further includes a process unit configured to process image data upon determination of successful authentication by the authentication process unit.

3 Claims, 15 Drawing Sheets

(56) References Cited

U.S. PATENT DOCUMENTS

| | | |
|---|---|---|
| 2009/0037981 A1 | 2/2009 | Kino |
| 2009/0237705 A1 | 9/2009 | Ikeda |

FOREIGN PATENT DOCUMENTS

| | | |
|---|---|---|
| JP | 2002-269043 | 9/2002 |
| JP | 2006-018640 | 1/2006 |
| JP | 2007-026294 | 2/2007 |
| JP | 2007-295294 | 11/2007 |
| JP | 2007-328411 | 12/2007 |
| JP | 2009-020742 | 1/2009 |
| JP | 2009-043038 | 2/2009 |
| JP | 2009-223728 | 10/2009 |

OTHER PUBLICATIONS

Notice of Rejection for corresponding Japanese patent application No. 2009-174612 dated Sep. 17, 2013.

Notice of Rejection for corresponding Japanese patent application No. 2009-174612 dated Jul. 2, 2013.

* cited by examiner

FIG.1 PRIOR ART
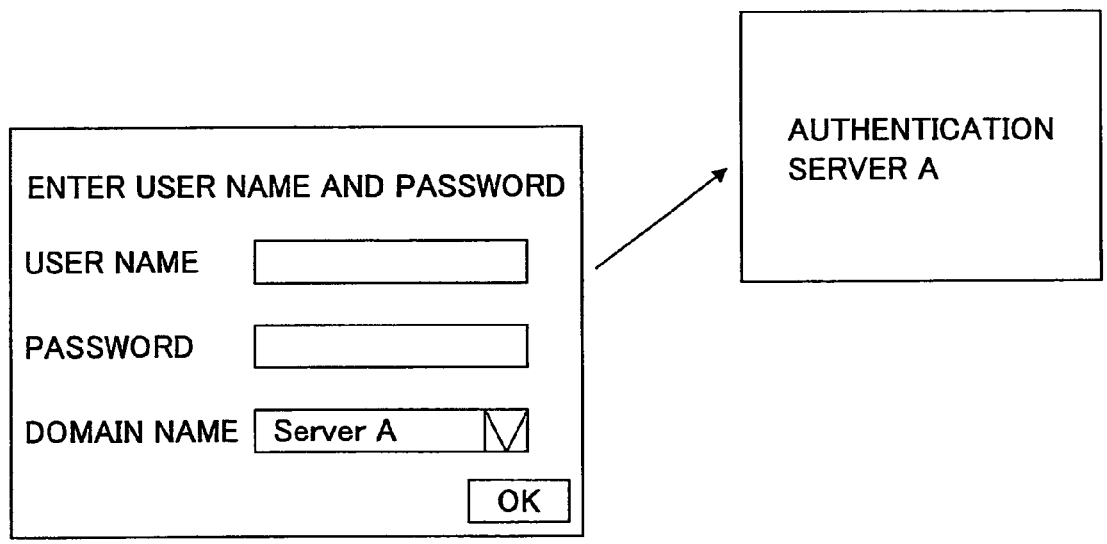
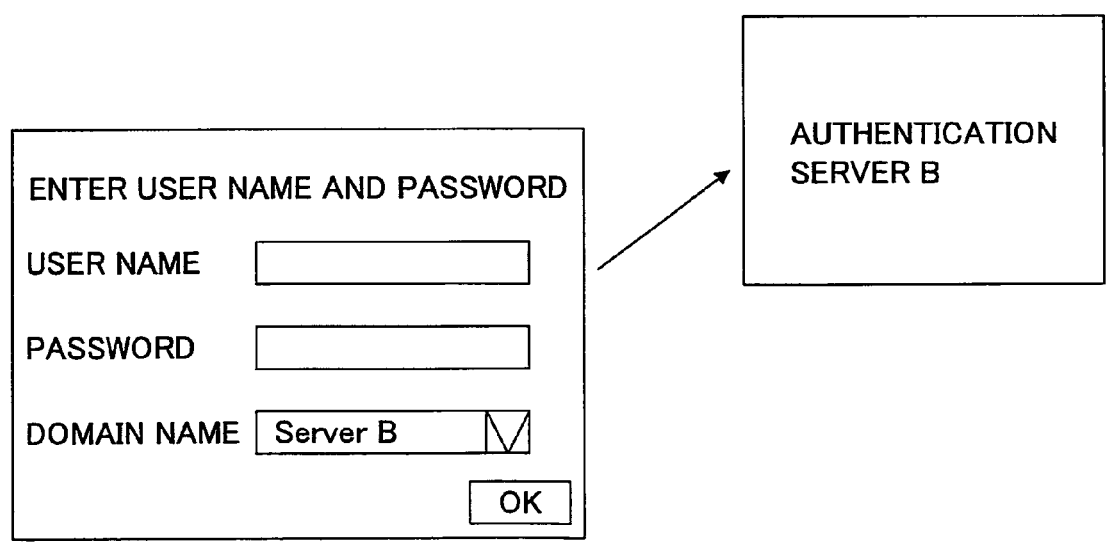

ENTER USER NAME AND PASSWORD

USER NAME

PASSWORD

DOMAIN NAME

DOMAIN NAME

AUTHENTICATION PROFILE  ○ NOT SET
⦿ SET

| | AUTHENTICATION PROFILE NAME | AUTHENTICATION METHOD | | REQUIRED AUTHENTICATION |
|---|---|---|---|---|
| ☑ | ADProf1 | ActiveDirectory | | ☑ |
| ☐ | ADProf2 | ActiveDirectory | | ☐ |
| ☑ | LDAPProf | LDAP | | ☑ |

FIG.11

| No. | AUTHENTICATION METHOD | REQUIRED AUTHENTICATION | WORKFLOW |
|---|---|---|---|
| 1 | 1, 2 | 1 | STORE IN FILE, TRANSMIT MAIL |
| 2 | 1, 2, 3 |  | TRANSMIT MAIL |
| . . . | . . . | . . . | . . . |

FIG.12

| ID | AUTHENTICATION PROCESS CONTENT | ADDRESS | DOMAIN NAME |
|---|---|---|---|
| 1 | LDAP | 192.168.1.xxx | AAA.co.jp |
| 2 | ActiveDirectory | 192.168.1.yyy | BBB.co.jp |
| ... | ... | ... | ... |

IMAGE FORMING APPARATUS, IMAGE PROCESSING APPARATUS AND IMAGE DELIVERY SYSTEM

BACKGROUND OF THE INVENTION

1. Field of the Invention

The present invention generally relates to a user authentication technique using plural authentication servers.

2. Description of the Related Art

With the increased awareness about the importance of information security, user authentication is increasingly required when utilizing an information processing apparatus and the like installed in offices and other places. For example, a multifunction peripheral (MFP), which is an example of an information processing apparatus, may require user authentication using an IC card.

Meanwhile, increasing numbers of corporations are connecting MFPs and other image input/output devices to networks. Image input/output devices play an important role in enhancing work efficiency. An image delivery system capable of increasing the efficiency of document computerization and delivery is also important. An image delivery system typically includes an image input device (such as a scanner) and a delivery managing server. In the delivery managing server, multiple menus of various delivery processes adapted for various operations and purposes may be registered. For example, a user selects a process menu suitable for a particular operation on an operating panel (operating unit) of a scanner.

Japanese Laid-Open Patent Application No. 2006-018640 discloses that a delivery process and an image conversion process may be provided as plug-ins, so that a user or an administrator can combine such plug-ins in a desired manner to create an input workflow, an image conversion workflow, and an output workflow. Using such workflows, an image data delivery process may be performed.

FIG. 1 illustrates a conventional authentication process where an information processing apparatus is connected to plural authentication servers A and B. In this conventional example, although the image processing apparatus is connected to the authentication servers A and B, once a user selects one of the authentication servers A or B for an authentication process, another user using the other authentication server cannot perform an authentication process.

In an image delivery system, an authentication process may be performed separately for the utilization of the system ("initial stage"), and the later process of image delivery ("later stage") due to security considerations. FIG. 2 is a flowchart of a conventional authentication process in such an image delivery system. First a user selects an authentication server for, system utilization. Then, an authentication process is performed by the selected authentication server based on the input of authentication information (such as user ID, password, and domain name). Upon successful authentication, the authentication information is temporarily retained and used for an authentication process in the later stage.

Thus, in the conventional image delivery system, the initial-stage authentication information may be used for the later-stage authentication process. In this case, when separate authentication servers are designated for the initial-stage authentication process and the later-stage authentication process, if one authentication server is selected for the initial-stage authentication process, the other authentication server cannot be utilized for the later-stage image delivery process, so that the later-stage process cannot be performed.

SUMMARY OF THE INVENTION

The disadvantages of the prior art are overcome by the present invention which, in one aspect, is an image forming apparatus connected to plural authentication servers. The image forming apparatus includes an acquiring unit configured to acquire user identifying information identifying a user and a password; a selecting unit configured to select server identifying information identifying two or more of the plural authentication servers; an authentication process unit configured to transmit the user identifying information and the password to the two or more authentication servers identified by the selected server identifying information, and acquire an authentication result from the two or more authentication servers. The authentication process unit determines that authentication is successful upon reception of the authentication result indicating successful authentication by at least one of the two or more authentication servers. The image forming apparatus further includes a process unit configured to process image data upon determination of successful authentication by the authentication process unit.

In another aspect, the present invention provides an image processing apparatus connected to plural authentication servers. The image processing apparatus includes an image acquiring unit configured to acquire image data; a common information acquiring unit configured to acquire common information including user identifying information identifying a user and a password; a unique information acquiring unit configured to acquire unique information including server identifying information identifying two or more of the plural authentication servers; an authentication process unit configured to transmit the common information to the two or more authentication servers identified by the unique information, and acquire an authentication result from the two or more authentication servers. The authentication process unit determines that authentication is successful upon reception of the authentication result indicating successful authentication by at least one of the two or more authentication servers. The image processing apparatus further includes a process unit configured to process the acquired image data upon determination of successful authentication by the authentication process unit.

In another aspect, the present invention further provides an image delivery system in which plural authentication servers, an image forming apparatus, and an image processing apparatus are connected via a network. The image forming apparatus includes an image acquiring unit configured to acquire image data; an information acquiring unit configured to acquire user identifying information identifying a user and a password; a selecting unit configured to select server identifying information identifying two or more of the plural authentication servers; and an authentication process unit configured to transmit the user identifying information and the password to the two or more authentication servers identified by the selected server identifying information, and receive an authentication result from the two or more authentication servers. The authentication process unit determines that authentication is successful upon reception of the authentication result indicating successful authentication by at least one of the two or more authentication servers. The image forming apparatus further includes a transmit unit configured to transmit the image data to the image processing apparatus upon determination of successful authentication by the authentication process unit. The image processing apparatus includes a receive unit configured to receive the image data from the image forming apparatus; and a delivery unit configured to deliver the received image data in accordance with a workflow defining one or more processes.

BRIEF DESCRIPTION OF THE DRAWINGS

FIG. 1 illustrates an authentication process in which an authentication server is selected according to a conventional technique;

FIG. 10 is an example of an authentication method setting screen;

FIG. 11 illustrates a data structure of workflow information;

FIG. 12 illustrates a data structure of authentication method information;

DETAILED DESCRIPTION OF THE PREFERRED EMBODIMENTS

Figure 2:
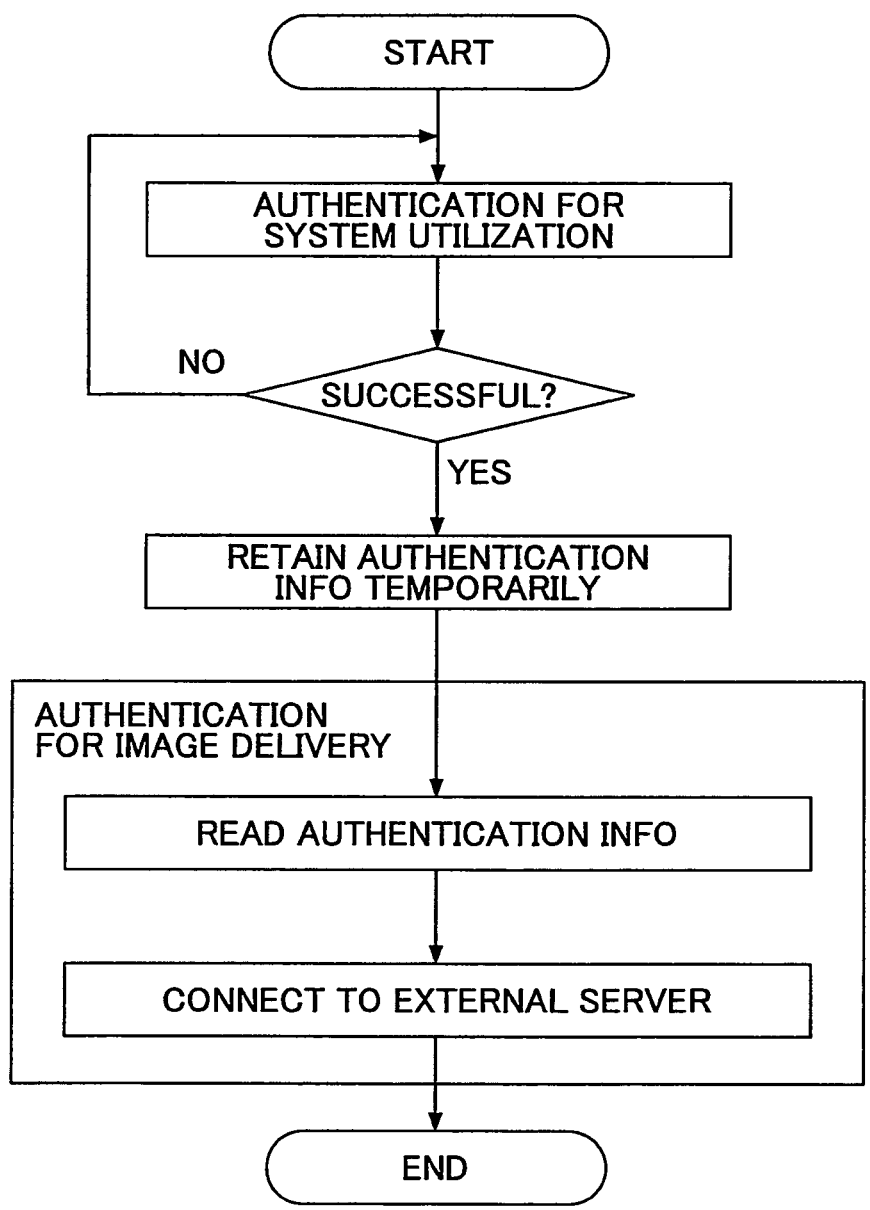
FIG. 2 illustrates a conventional authentication process in an image delivery system.

Various embodiments of the present invention are described with reference to the attached drawings, in which like reference numerals refer to identical or functionally-similar elements throughout the separate views.

Although the following description of the embodiments of the present invention refer to a MFP an image input apparatus for inputting image data, this is merely an example. In accordance with other embodiments of the present invention, a scanner, a facsimile, or a copier may be used as an image input apparatus.

Embodiment 1

System Structure and Hardware Structure

Figure 3:
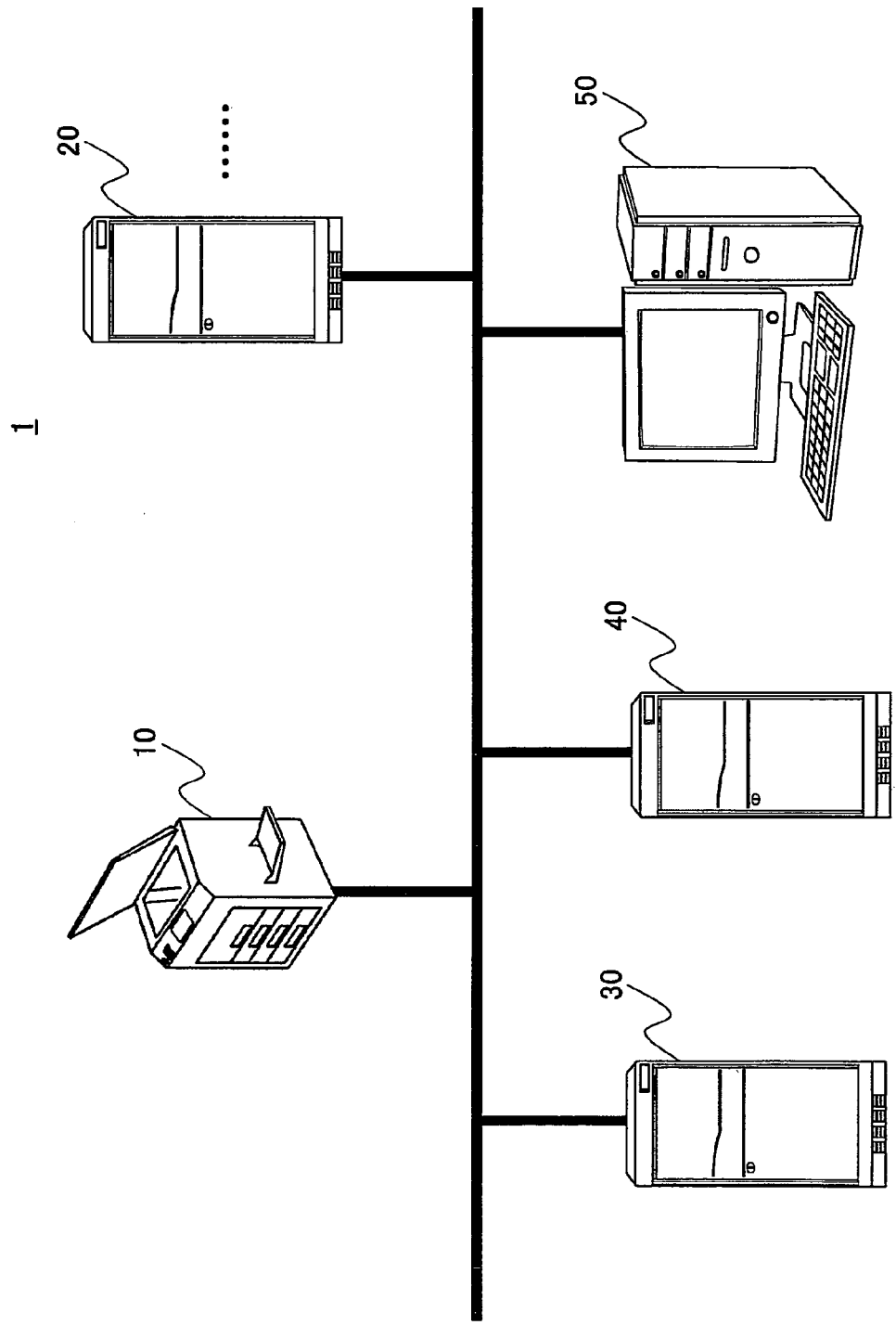
FIG. 3 illustrates an image delivery system according to Embodiment 1 of the present invention.

FIG. 3 illustrates an image delivery system 1 according to Embodiment 1. The image delivery system 1 includes a MFP (multifunction peripheral) 10, plural authentication servers 20, an image processing server 30, an image managing server 40, and an information processing terminal 50, which are connected via a network. The information processing terminal 50 may include a personal computer, a PDA (personal data assistant), and the like. The MFP 10 is an example of an image forming apparatus.

The MFP 10 may include the multiple functions of a scanner, a copier, a printer, and a facsimile machine. The MFP 10 may be configured to generate image data by scanning a recording medium, such as a sheet of paper, and then transmit the image data to the image processing server 30. The MFP 10 is described in greater detail later. The image data generated by the MFP 10 may include document image data.

The authentication servers 20 acquire user information and a password from a device connected to the network to perform authentication. The authentication servers 20 may include a LDAP (Light Weight Directory Access Protocol) server. The image processing server 30 may include a computer, such as a workstation, configured to receive the image data scanned by the MFP 10 and perform various processes, such as a delivery process, in accordance with a designated workflow. The workflow may include a mail transmit workflow, a FAX transmit workflow, and a folder delivery workflow.

The image processing server 30 implements a workflow based on input image data. The workflow may be configured by a user for performing a document storage or delivery process. Thus, the image processing server 30 also provides an image processing function. The details of the image processing server 30 are described later. The image processing server 30 may be incorporated within the MFP 10.

The image managing server 40 stores and manages image data delivered from the image processing server 30. The image managing server 40 may be configured to require authentication by Active Directory.

The information processing terminal 50 may be configured such that an administrating tool for data delivery is started up by an administrator, and then plug-ins for input, image conversion, and output processes are successively selected so as to create a workflow. The number of the MFPs, the various servers, and the information processing terminals connected to the network is not particularly limited. When the image processing server 30 is incorporated within the MFP 10, a workflow may be created within the MFP 10.

Figure 4:
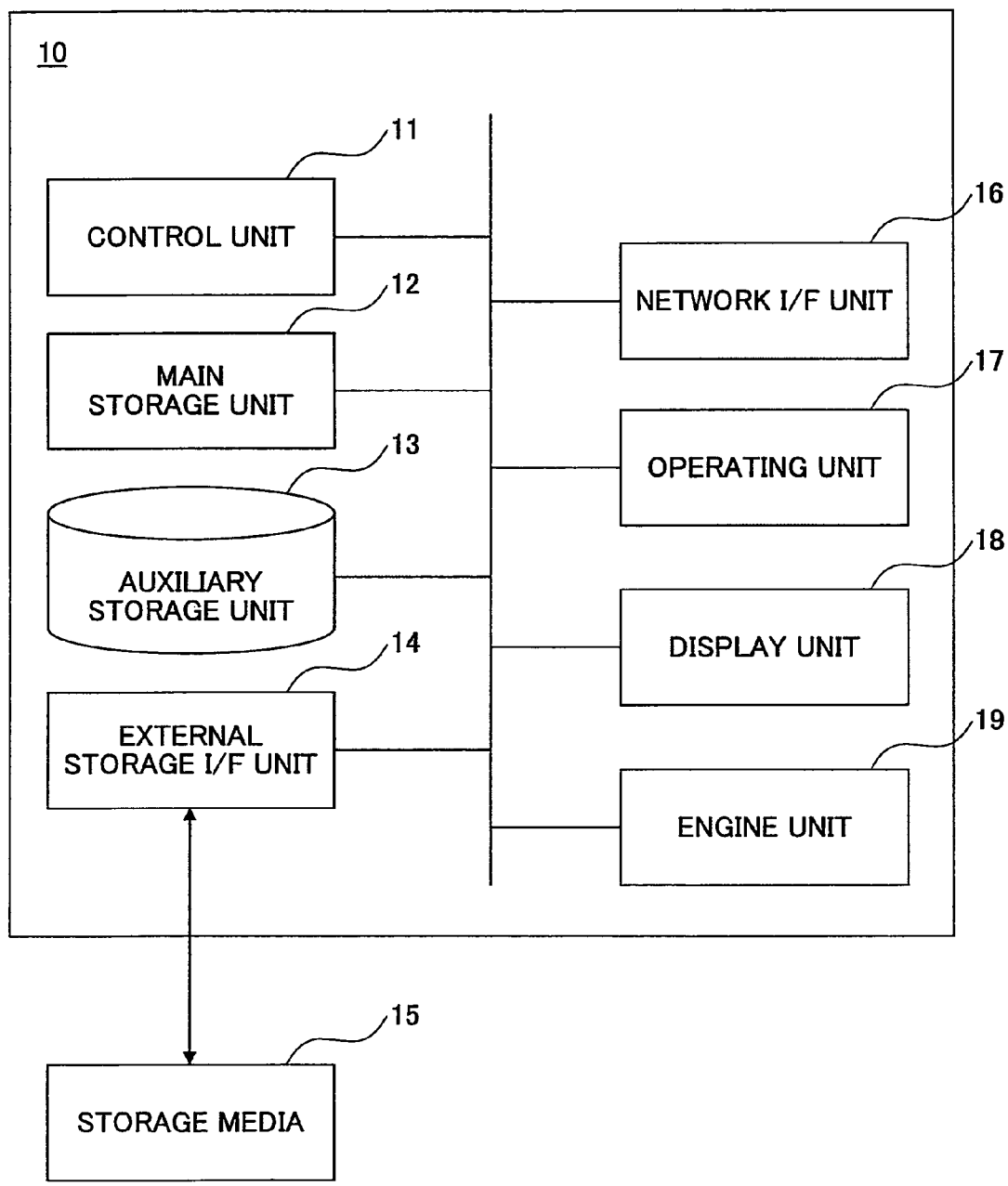
FIG. 4 is a block diagram of a hardware structure of a MFP according to Embodiment 1.

Next, a hardware structure of the MFP 10 and the image processing server 30 is described. FIG. 4 is a block diagram of a hardware structure of the MFP 10. The MFP 10 includes a control unit 11, a main storage unit 12, an auxiliary storage unit 13, an external storage I/F (interface) unit 14, a network I/F unit 16, an operating unit 17, a display unit 18, and an engine unit 19.

The control unit 11 may include a CPU configured to control various units and perform data calculations and processing in a computer. The control unit 11 may also provide a processing unit for executing a program stored in the main storage unit 12. For example, the control unit 11 receives data from an input device or a storage unit, processes or calculates the data, and then outputs a result to an output device or the storage unit in accordance with the program.

The main storage unit 12 may include a ROM (Read Only Memory) or a RAM (Random Access Memory) in which an OS (operating system) that is basic software executed by the control unit 11, an application software program and various other data may be saved or temporarily stored. The auxiliary storage unit 13 may include a HDD (Hard Disk Drive) configured to store data used by the application software program.

The external storage I/F unit 14 provides an interface between the MFP 10 and a recording medium 15 (such as a flash memory) via a data transmission channel, such as a USB (Universal Serial Bus) cable. The recording medium 15 may store a program that is installed into the MFP 10 via the external storage I/F unit 14. The network I/F unit 16 provides an interface between the MFP 10 and a peripheral device. The peripheral device may have a communication function and may be connected via a network, such as a LAN (Local Area Network) or WAN (Wide Area Network), using a wired or wireless data transmission channel.

The operating unit 17 and the display unit 18 may include a LCD (Liquid Crystal Display) unit having key switches (hardware keys) and a touch panel function (including GUI (Graphical User Interface) software keys). The operating unit 17 and the display unit 18 thus provide a display unit and an input unit providing a user interface (UI) allowing utilization of the functions of the MFP 10 by a user. The engine unit 19 may include a plotter or a scanner unit that actually performs an image formation process.

Figure 5:
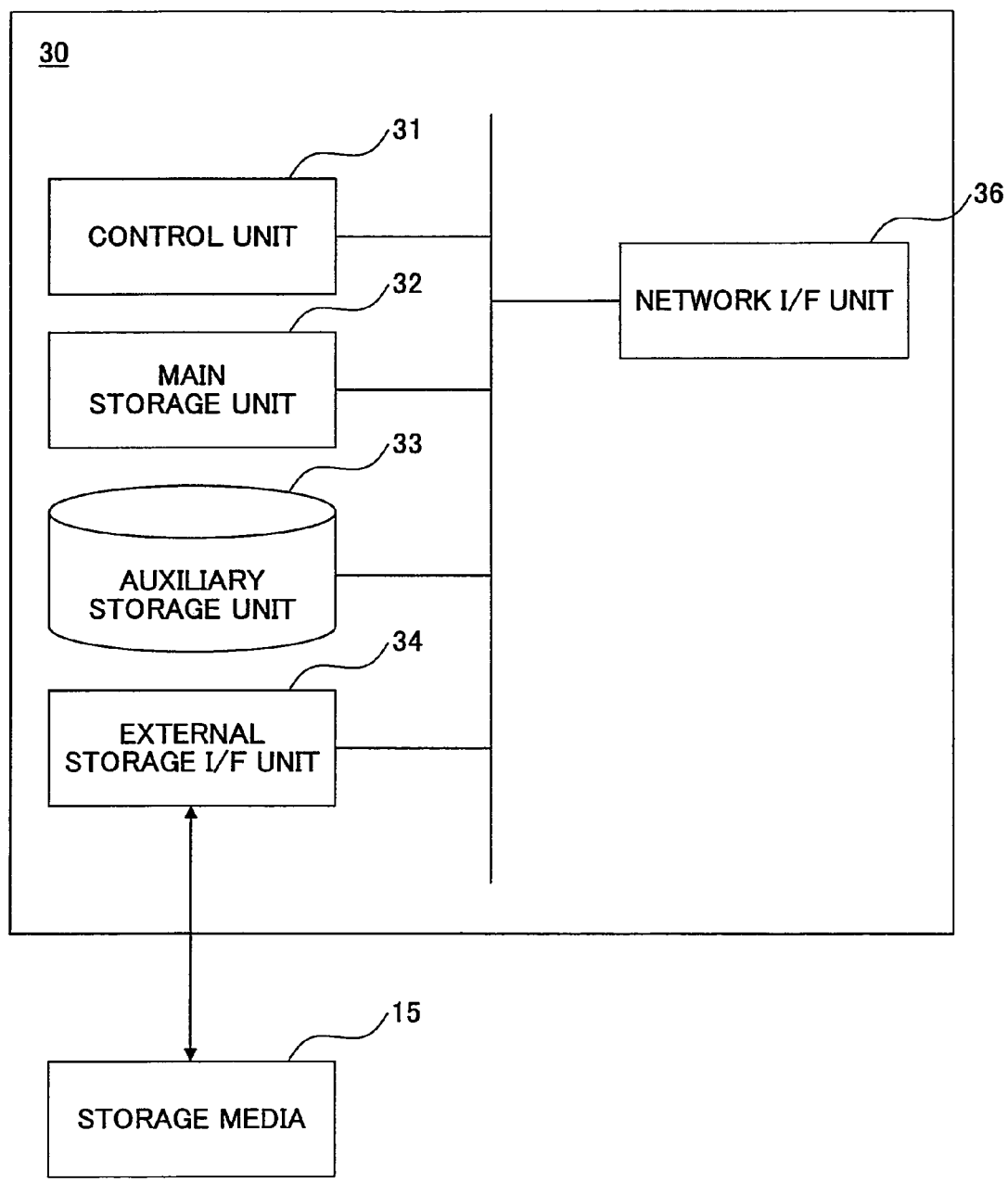
FIG. 5 is a block diagram of a hardware structure of an image processing server according to Embodiment 1.

FIG. 5 is a block diagram of a hardware structure of the image processing server 30. In the illustrated example, the image processing server 30 includes a control unit 31, a main storage unit 32, an auxiliary storage unit 33, an external storage I/F unit 34, and a network I/F unit 36. The control unit 31 may include a CPU configured to control various units and process or calculate data in a computer. The control unit 31 may also provide a processing unit for executing a program stored in the main storage unit 32. For example, the control unit 31 receives data from an input device or a storage unit, processes or calculates the data, and then outputs a result to an output device or the storage unit.

The main storage unit 32 may include a ROM (Read Only Memory) and a RAM (Random Access Memory) in which an OS that is basic software executed by the control unit 31, and an application software program and various data may be saved or temporarily stored. The auxiliary storage unit 33 may include a HDD configured to store data used by an application software program.

The external storage I/F unit 34 provides an interface between the image processing server 30 and a recording medium 15 (such as a flash memory) connected via a data transmission channel, such as a USB cable. The recording medium 15 may store a program that is installed into the image processing server 30 via the external storage I/F unit 34.

The network I/F unit 36 provides an interface between the image processing server 30 and a peripheral device having a communication function. The peripheral device may be connected via a network, such as a LAN (Local Area Network) or a WAN (Wide Area Network), using a wired or wireless data transmission channel. The image processing server 30 may also include an operating unit or a display unit.

Functional Structure of MFP

Figure 6:
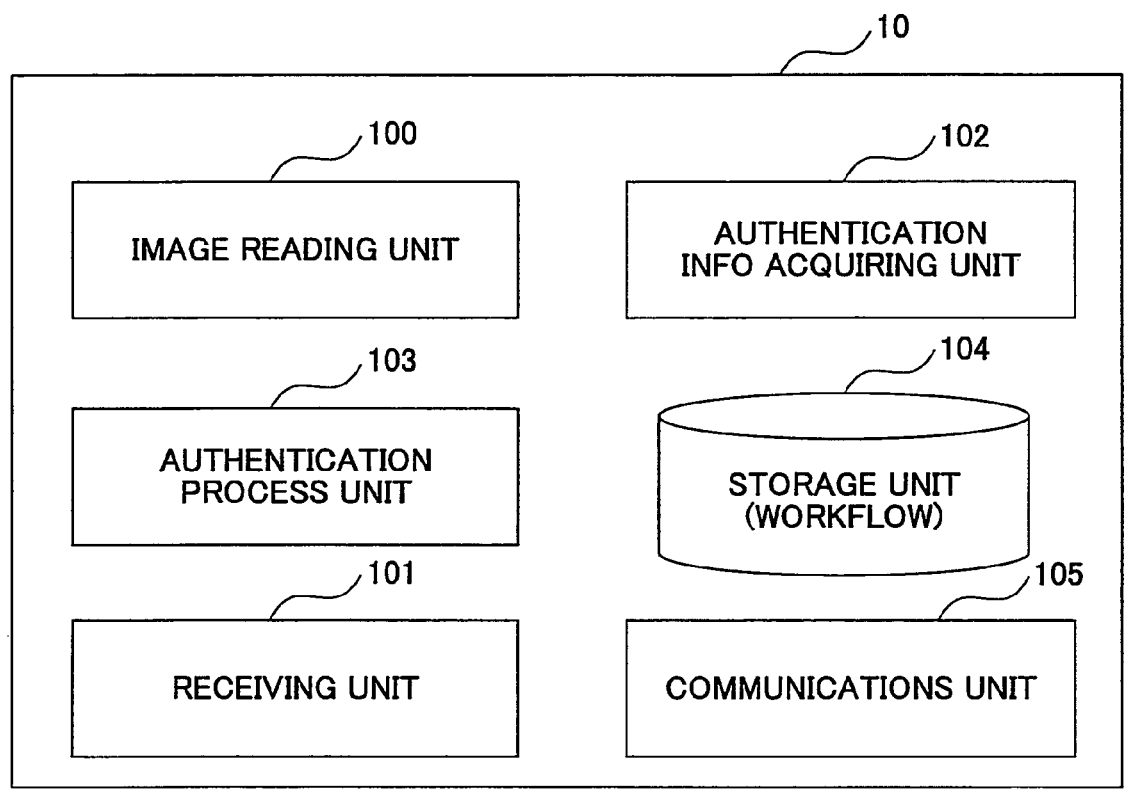
FIG. 6 is a block diagram of a functional structure of the MFP according to Embodiment 1.

FIG. 6 is a block diagram of a functional structure of the MFP 10. The MFP 10 includes an image reading unit 100, a receiving unit 101, an authentication information acquiring unit 102, an authentication process unit 103, a storage unit 104, and a communications unit 105. The typical functions of a conventional MFP, such as a print function, a copy function, and a FAX function, are included but not illustrated.

The image reading unit 100 acquires image data by reading an original sheet using a scan function (not illustrated). The image data may be received via facsimile, or acquired via the information processing terminal 50. The receiving unit 101 receives a request from a user for utilization of the image delivery system (FIG. 3). For example, the receiving unit 101 considers a workflow execution instruction as a system utilization request. A workflow execution instruction may be entered on the operating unit 17 or the display unit 18. Upon reception of such a system utilization request, the receiving unit 101 notifies the authentication information acquiring unit 102.

In response to the notification of system utilization request from the receiving unit 101, the authentication information acquiring unit 102 causes an authentication information acquiring screen to be displayed on the display unit 18, and then acquires authentication information entered or selected on the authentication information acquiring screen. The details of the authentication information acquiring unit 102 will be described later with reference to FIGS. 7 and 8.

Figures 8, 9:
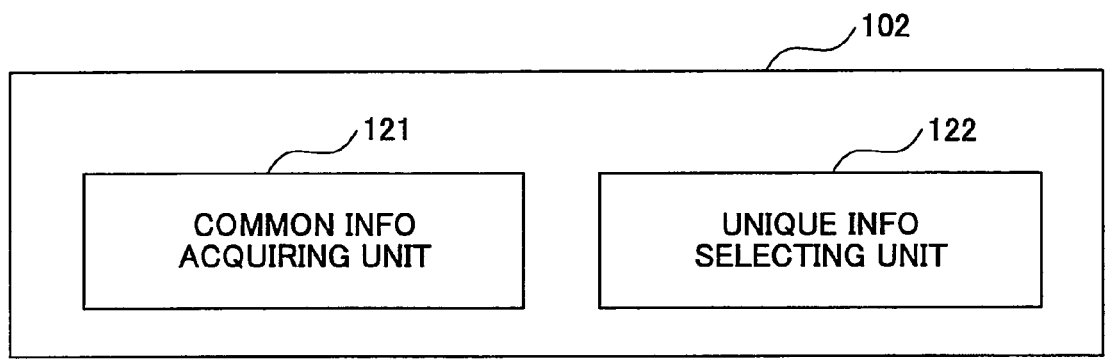
FIG. 8 is a block diagram of a functional structure of an authentication information acquiring unit.
FIG. 9 is an example of an authentication information acquiring screen.

FIG. 8 is a block diagram of a functional structure of the authentication information acquiring unit 102. In the illustrated example, the authentication information acquiring unit 102 includes a common information acquiring unit 121 and a unique information selecting unit 122. The common information acquiring unit 121 causes the display unit 18 to display an authentication information acquiring screen on which a user can enter user identifying information (such as a user ID or a user name) and a password. Thus, the common information acquiring unit 121 acquires user identifying information and a password, which may be together referred to as "common information".

The unique information selecting unit 122 causes the display unit 18 to display an authentication information acquiring screen for allowing a user to select identifying information (such as a domain name) of plural authentication servers set in the system. Thus, the unique information selecting unit 122 can acquire the identifying information (authentication server identifying information) of the selected plural authentication servers. The authentication server identifying information may be referred to as "unique information".

FIG. 9 illustrates an example of the authentication information acquiring screen. In the illustrated example, the authentication information acquiring screen includes the input fields for a user name and a password, so that the common information acquiring unit 121 can acquire the common information (user name and password). Further, the authentication information acquiring screen includes fields for plural domain names, so that the unique information acquiring unit 122 can acquire the selected plural domain names. Although the illustrated example includes two domain name fields, three or more domain name fields may be provided.

Referring back to FIG. 6, the authentication process unit 103 acquires the common information (user identifying information and password) and the unique information (authentication server identifying information) from the authentication information acquiring unit 102 as authentication information. The authentication process unit 103 then transmits the common information to the authentication servers indicated by the authentication server identifying information successively, and then acquires authentication results from the authentication servers. If there is at least one authentication result indicating successful authentication, the authentication process unit 103 determines that authentication is successful and transmits the authentication information to the image processing server 30 via the communications unit 105.

When a required domain name (or required authentication server) is set, the authentication process unit 103 does not recognize successful authentication unless the authentication server designated by the required domain name indicates successful authentication.

The storage unit 104 may be configured to store plug-ins for an input process, an image conversion process, and an output process, and also one or more workflows combining the plug-ins. The storage unit 104 is not necessarily required.

When the storage unit 104 is not provided, workflow information may be acquired from the storage unit 306 of the image processing server 30.

The communications unit 105 may be configured to transmit or receive device information and image data. For example, the communications unit 105 transmits the common information (authentication information) to the authentication servers, or transmits image data and a workflow process request made by a user to the image processing server 30. Such transmission and reception of image data may be included in an image data process.

Functional Structure of Image Processing Server

Figure 7:
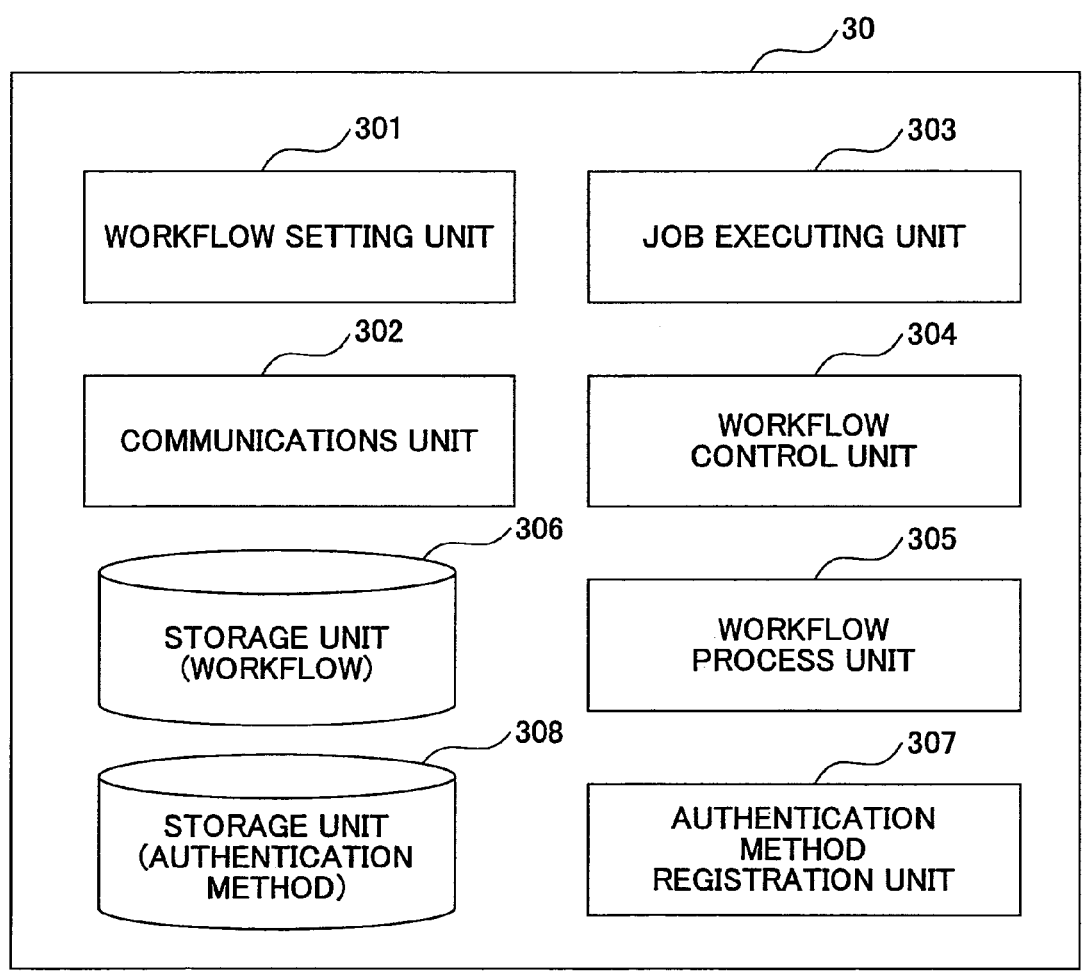
FIG. 7 is a block diagram of an image processing server according to Embodiment 1.

Referring to FIG. 7, a functional structure of the image processing server 30 is described. The image processing server 30 includes a workflow setting unit 301, a communications unit 302, a job executing unit 303, a workflow control unit 304, a workflow process unit 305, a storage unit 306, an authentication method registration unit 307, and a storage unit 308.

The workflow setting unit 301 may be configured to store a workflow based on a combination of the plug-ins for the input that is set by a user, image conversion, and output processes, in the storage unit 306 in XML format. The workflow setting unit 301 may also be configured to set an authentication method for a workflow. FIG. 10 illustrates an example of an authentication method setting screen. The authentication method setting screen of FIG. 10 is an example of an authentication profile screen for workflows that may appear when an administrator opens an administrating tool of the image processing server 30 using the information processing terminal 50. As illustrated in FIG. 10, the administrator can set plural authentication methods for a workflow. The administrator can also set a required authentication method (or required authentication server).

Referring to FIG. 7, the communications unit 302 may be configured to transmit or receive device information or image data. For example, the communications unit 302 receives image data from the MFP 10 and transmits a result of image processing of the image data to a workflow delivery destination. The communications unit 302 may also receive authentication information from the MFP 10. The communications unit 302, upon reception of a workflow process request (job request) from the MFP 10, may output workflow identifying information or bibliographic information (such as address information) of each workflow process to the job executing unit 303.

The job executing unit 303 executes a job in accordance with a request from the MFP 10. For example, the job executing unit 303 sends a workflow process request to the workflow control unit 304 and also outputs workflow identifying information, bibliographic information of a workflow process, and image data. In response to the workflow process request from the job executing unit 303, the workflow control unit 304 controls the execution of a process contained in the workflow. In a case where an authentication method is set for the workflow, the workflow control unit 304 accesses an authentication server indicated by the unique information contained in the authentication information acquired from the MFP 10, and causes the authentication server to perform an authentication process using the common information contained in the authentication information.

In this case, upon reception of a successful authentication result from the authentication server set in the workflow, the workflow control unit 304 causes the relevant workflow process to be performed. If the authentication result indicates unsuccessful authentication, the workflow control unit 304 records an authentication error in a log.

The workflow process unit 305 implements a workflow in response to a process execution instruction from the workflow control unit 304 and then performs a delivery process. Thus, the workflow process unit 305 executes the processes contained in the workflow in order of flow and then delivers image data to a delivery destination. The processes performed by the workflow process unit 305 may include an allocating process, an image process, and a delivery process (output process). The allocating process may involve determining where image data should be delivered. For example, the allocating process determines whether the image data should be delivered to a folder or transmitted to a mail server, based on the last process contained in the workflow.

The image process refers to a process of image conversion, such as PDF conversion or TIFF conversion. The delivery process refers to a process of delivering image data to one or more delivery destinations determined by the allocating process. The workflow process unit 305 may be configured to perform at least a delivery process. The storage unit 306 may be configured to store plug-ins for an input process, an image conversion process, and an output process, and also one or more workflows combining the various plug-ins. The storage unit 306 may also store workflow information indicating an authentication method set for a workflow.

FIG. 11 illustrates a data structure of workflow information. In the illustrated example, authentication methods 1 and 2 are set for a workflow ID 1. A required authentication 1 (see FIG. 9) is also set for the workflow ID 1. Further, delivery processes of "File storage" and "Mail transmission" are set for ID 1. Either or both of these delivery processes may be performed based on a user selection. The authentication method numbers correspond to authentication method IDs as will be described later. The setting of the required authentication is not necessarily required.

The authentication method registration unit 307 causes information of authentication methods used in the system ("authentication method information") to be stored in the storage unit 308. The authentication method information may include an authentication process ID, authentication process content, an address, and a domain name.

FIG. 12 illustrates a data structure of the authentication method information stored in the storage unit 308. In the illustrated example, the authentication method information includes an ID, an authentication process content, an address, and a domain name that are associated with one another. For example, the authentication method ID 1 is associated with the process content "LDAP", the address "192.168.1.xxx", and the domain name "AAA.co.jp".

The domain names in the authentication method information correspond to the alternative domain names shown in the authentication information acquiring screen illustrated in FIG. 8. While in FIGS. 11 and 12, the information is shown in a table format, the same information may be stored in XML format.

Initial-Stage Authentication Process

Figure 13:
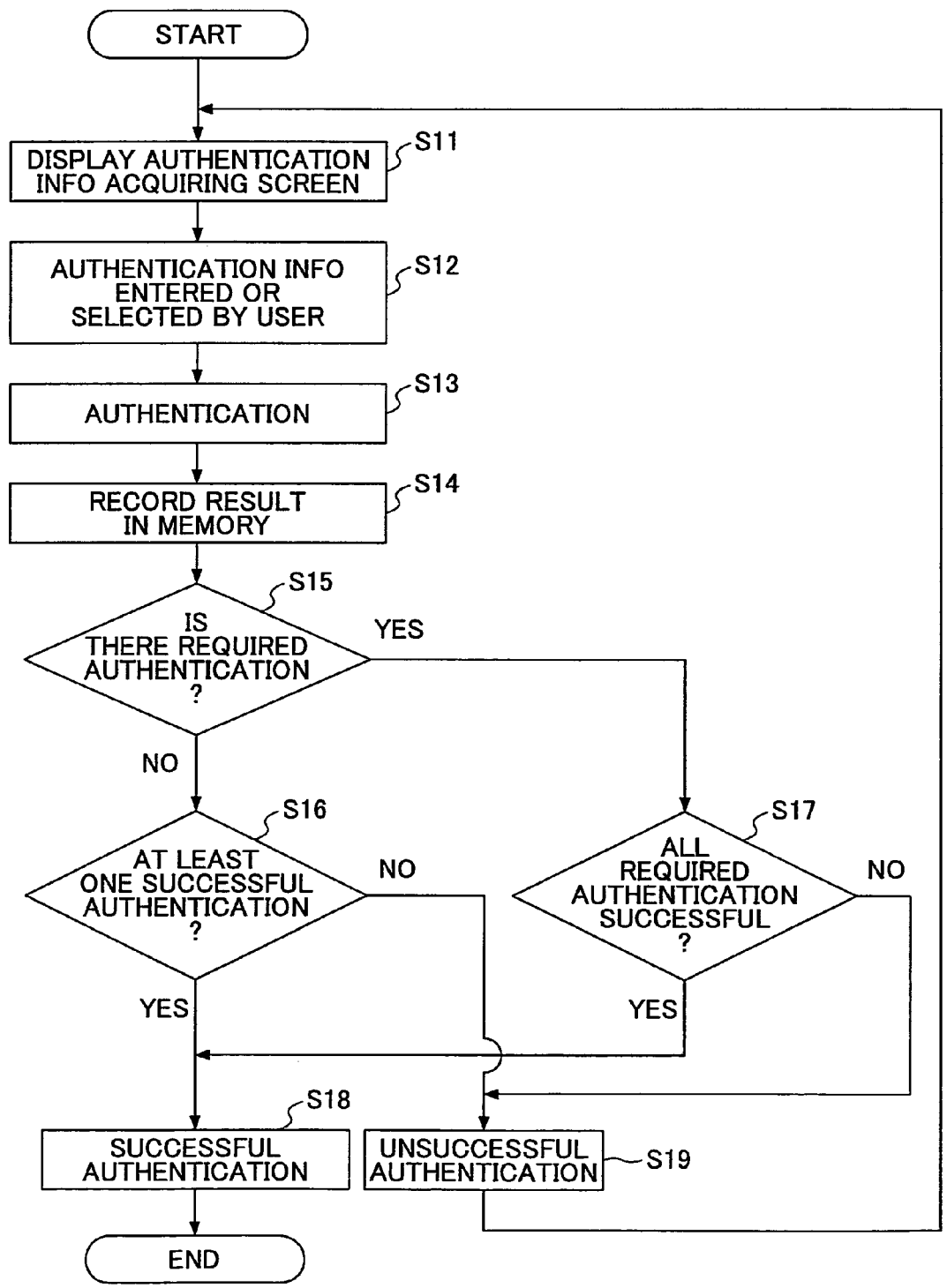
FIG. 13 is a flowchart of an authentication process at the time of utilization of a system according to Embodiment 1.

Next, an authentication process at the time of utilization of the system (initial stage) is described with reference to a flowchart of FIG. 13. In the illustrated example, upon detection of a workflow executing operation in step S11, the authentication information acquiring unit 102 of the MFP 10 causes the authentication information acquiring screen to be displayed, such as illustrated in FIG. 8. The "workflow executing operation" herein refers to the actual execution of a process following the pressing of a workflow executing button by a user.

In step S12, the user inputs or selects authentication information. Specifically, the common information including a user name and a password may be input, while the unique information including an authentication server domain name may be selected. Two or more items of unique information may be selected. In step S13, the authentication process unit 103 acquires the authentication information acquired by the authentication information acquiring unit 102, and then transmits the common information to the authentication servers designated by the unique information, so that the designated authentication servers can perform authentication.

In step S14, the authentication process unit 103 records an authentication result received from the designated authentication servers in a memory (not illustrated). In step S15, the authentication process unit 103 determines if any of the authentication servers that performed authentication involves a required authentication. If the determination in step S15 indicates NO (no required authentication), the process goes to step S16. If the determination result is YES, the process goes to step S17. In step S16, the authentication process unit 103 determines whether at least one of the authentication results stored in memory indicates successful authentication. If the determination in step S16 indicates YES (at least one successful authentication), the process goes to step S18. If NO (no successful authentication), the process goes to step S19.

In step S17, the authentication process unit 103 determines whether the authentication results of all required authentications stored in memory indicate successful authentication. If the determination in step S17 indicates YES (all required authentications were successful), the process goes to step S18. If the determination indicates NO (not all required authentications were successful), the routine goes to step S19. In step S18, the authentication process unit 103 determines that authentication has succeeded, and grants utilization of the system. In step S19, the authentication process unit 103 determines that authentication has failed, and therefore returns to step S11 to cause the display of the authentication information acquiring screen again.

Thus, authentication is performed by plural authentication servers based on the authentication information entered by the user. If any of the authentication servers indicates successful authentication, it is determined that authentication has succeeded. When one or more required authentications are set, successful authentication may be determined only when all of the required authentications are successful.

Later-Stage Authentication Process

Next, an authentication process for actually performing a delivery process after utilization of the system is granted is described (later-stage authentication). For example, when a scanned image needs to be saved in a file in a file server (such as the image managing server 40), access to the image managing server 40 requires authentication.

Figure 14:
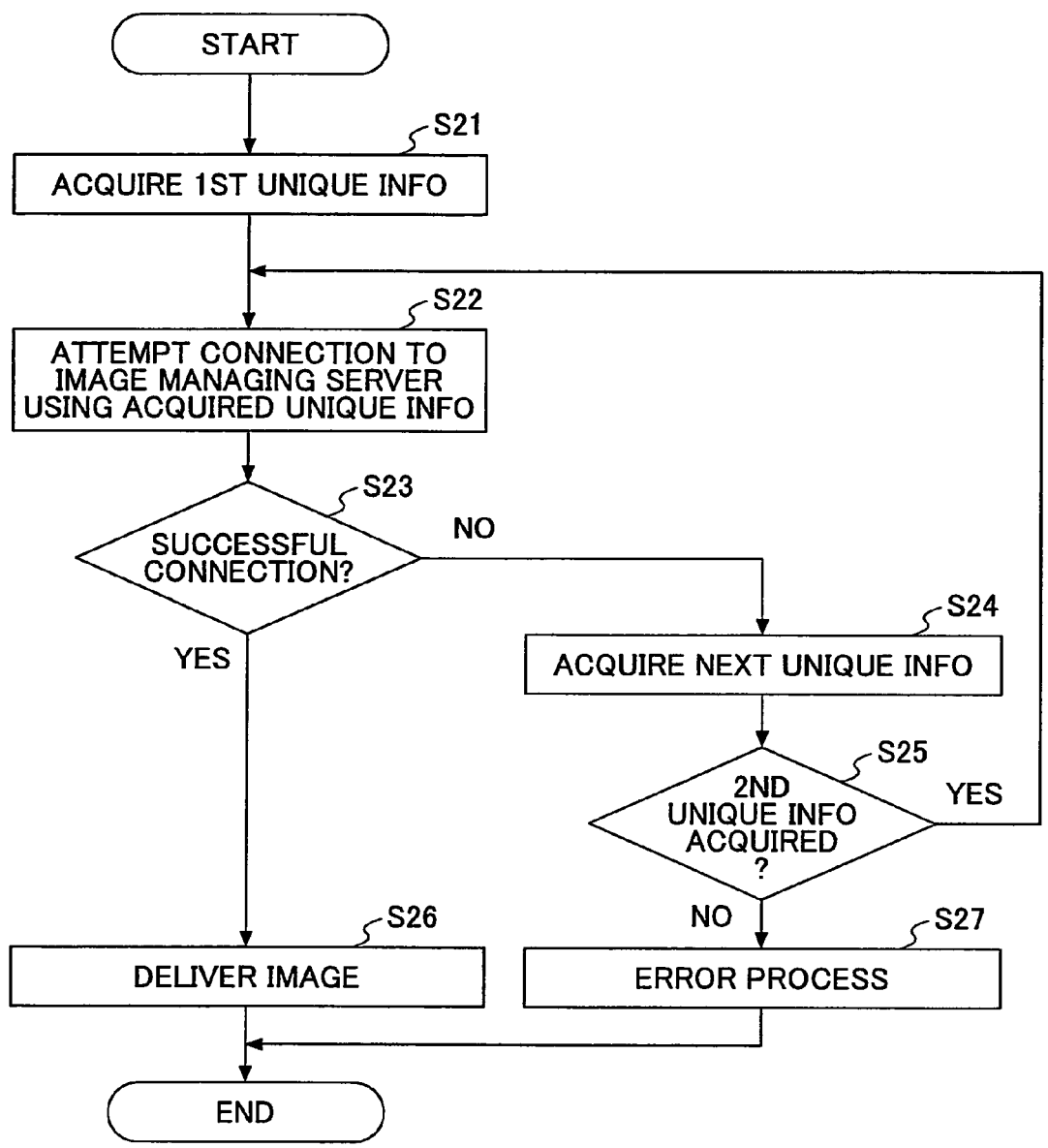
FIG. 14 is a flowchart of an authentication process in a delivery process.

FIG. 14 is a flowchart of the later-stage authentication process for the delivery process. In step S21, the workflow control unit 304 acquires the first unique information in the authentication information acquired from the MFP 10. In step S22, the workflow control unit 304 causes the authentication server designated by the acquired unique information to perform authentication in an attempt to access the image managing server 40. In step S23, the workflow control unit 304 determines whether connection to the image managing server 40 has been successful. If the determination in step S23 indicates that the connection is successful, the process goes to step S26; If not, the process goes to step S24.

In step S24, the workflow control unit 304 attempts to acquire the next unique information. In step S25, it is determined whether the next unique information has been acquired. If acquired, the process returns to S22, and the workflow control unit 304 attempts to connect to the image managing server 40 again using the acquired unique information. If the determination in S25 indicates an unsuccessful result, the workflow control unit 304 goes to step S27. In step S26, because connection to the image managing server 40 has been successful, the workflow control unit 304 delivers the image data to the image managing server 40. In step S27, because the attempt to connect to the image managing server 40 has been unsuccessful, the workflow control unit 304 performs an error process in which an error is recorded in a log.

Figure 15A:
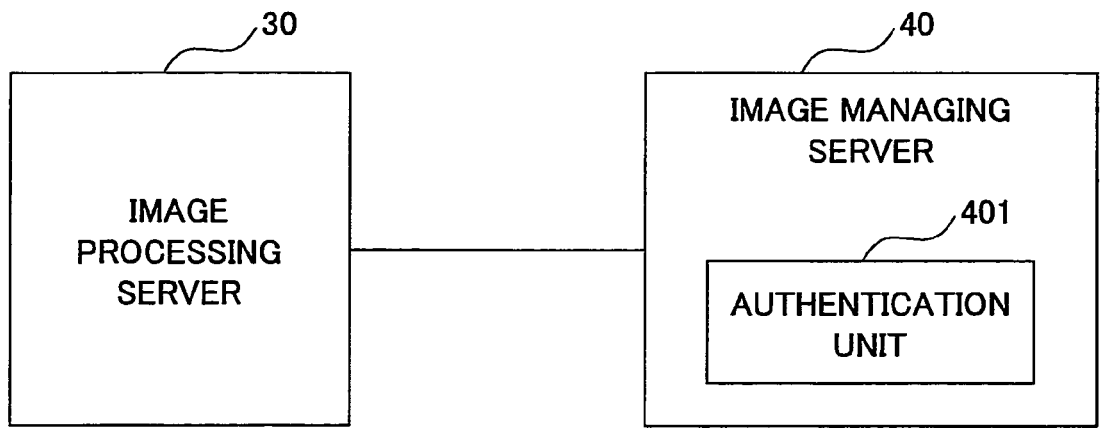
FIG. 15A illustrates an authentication process performed by an image managing server.

For accessing the image managing server 40, two authentication methods are considered. FIG. 15A illustrates an authentication method in which the image managing server 40 includes an authentication unit 401. In this method, the workflow control unit 304 attempts authentication for access to the image managing server 40 using the common information of the acquired authentication information. If the user name and password entered at the time of system utilization match the user name and password in the authentication unit 401, connection to the image managing server 40 is allowed.

Figure 15B:
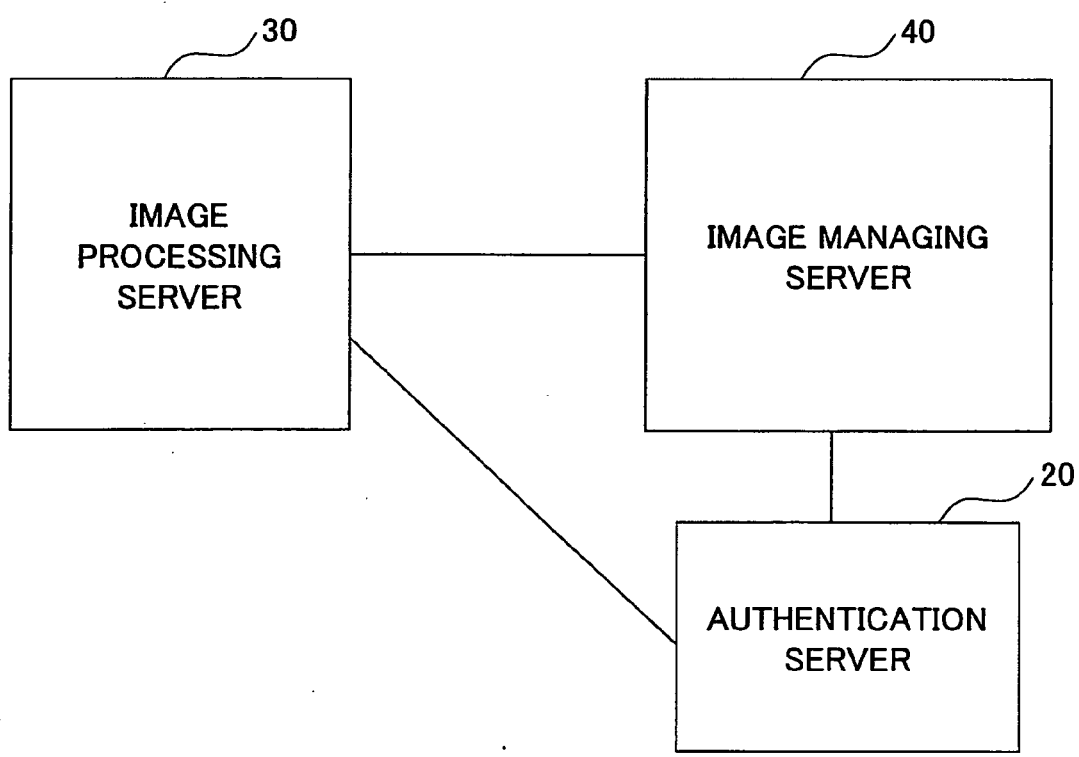
FIG. 15B illustrates an authentication process performed by an authentication server.

FIG. 15B illustrates the other method of authentication in which the image managing server 40 performs authentication using an authentication server 20. In this case, the authentication process illustrated in FIG. 14 is performed. Specifically, the workflow control unit 304 transmits the common information to the authentication server 20 designated by the unique information of the acquired authentication information, so that the designated authentication server 20 can perform an authentication process. The workflow control unit 304 of the image processing apparatus 30 allows connection to the image managing server 40 if the acquired unique information contains an ID of the authentication server 20 for connection to the image managing server 40.

Thus, in the later-stage process following the grant of utilization of the system, the same authentication information used at the time of utilization of the system can be reused when later authentication is required. For example, when LDAP and Active Directory use the same user name and password, by performing authentication not just by LDAP but also by Active Directory at the time of utilization of the system, an authentication process for connecting to the image managing server 40 in a later-stage process can be performed using the authentication information (unique information) for Active Directory.

Embodiment 2

Figure 16:
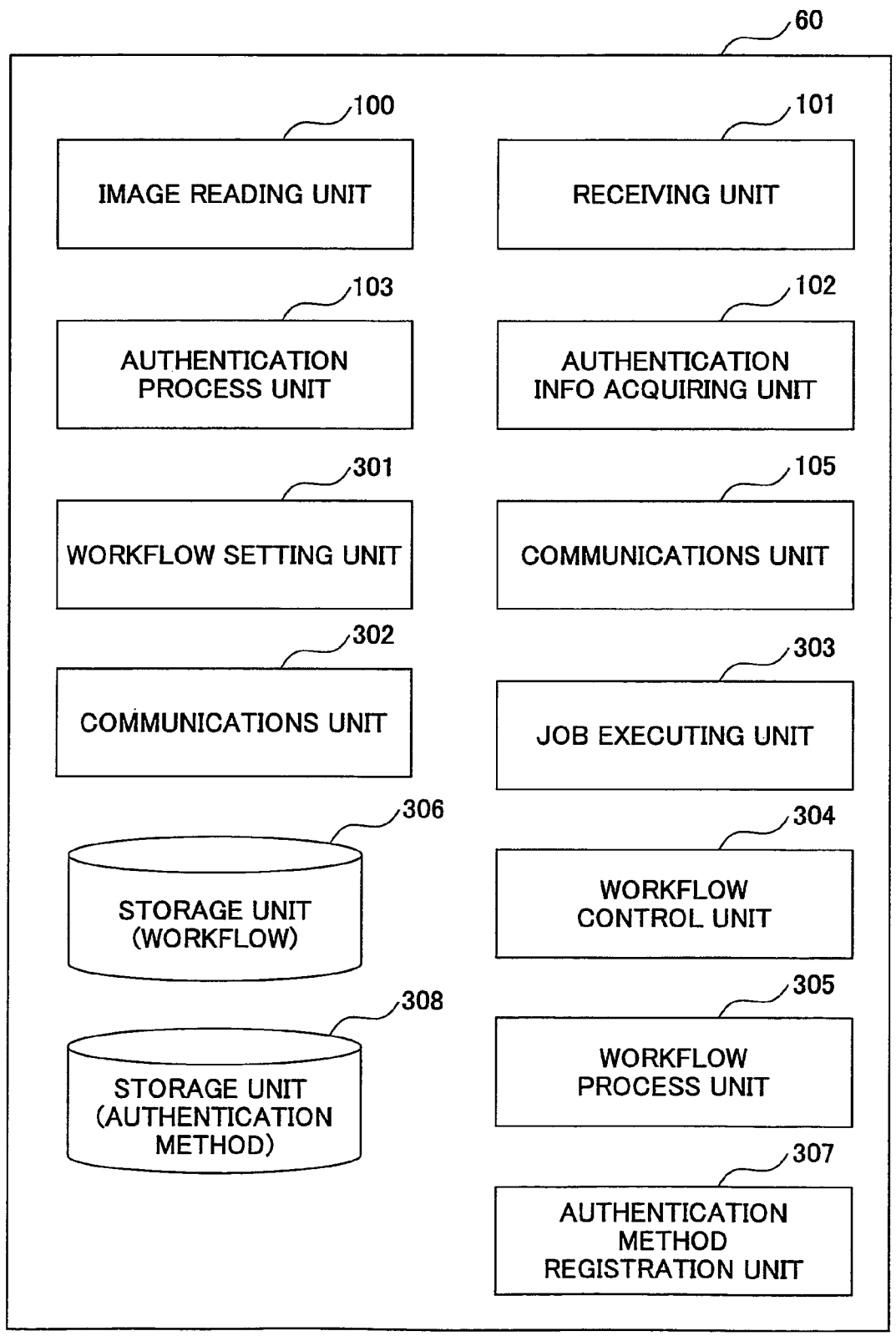
FIG. 16 is a block diagram of a functional structure of an MFP according to Embodiment 2.

Next, an MFP 60 according to Embodiment 2 is described. The MFP 60 includes the image processing server 30 described with reference to Embodiment 1. FIG. 16 is a block diagram of a functional structure of the MFP 60. The MFP 60, in which the image processing server 30 according to Embodiment 1 is incorporated, provides basically the same functions that the MFP 10 (FIG. 6) and the image processing server 30 (FIG. 7) provide. Thus, in accordance with Embodiment 2, the processes according to Embodiment 1 can be performed by the MFP 60 alone.

An authentication system according to an embodiment of the present invention may be applied to a system in which an information processing apparatus is connected to plural authentication servers.

A program executed by the image processing server or the MFP according to Embodiment 1 or 2 may be recorded in a computer-readable recording medium, such as a CD-ROM, a flexible disc (FD), a CD-R, or a DVD (Digital Versatile Disk), in an installable or executable file format. A program executed by the image processing server or the MFP according to Embodiment 1 or 2 may be stored in a computer connected to a network, such as the Internet, so that the program can be downloaded via the network into the information processing server or the MFP. Such a program may also be provided or distributed via a network such as the Internet. Alternatively, the program may be provided in a ROM and the like and then the ROM may be supplied to the information processing server or the MFP.

The program executed by the image processing server or the MFP according to Embodiment 1 or 2 may have a modular structure including the various units of the embodiments of the present invention. A CPU (processor) as a hardware unit may be configured to read the program from any of the aforementioned recording media and execute the program, so that the various units can be loaded into a main storage unit in order to realize the various units.

In accordance with an embodiment of the present invention, an authentication method for performing an authentication process with plural authentication servers includes acquiring user identification information identifying a user and a password; selecting server identifying information identifying two or more of the plural authentication servers; transmitting the user identification information and the password to the two or more authentication servers selected by the selecting step and acquiring an authentication result from the two or more authentication servers; and determining that authentication is successful upon reception of the authentication result indicating successful authentication by at least one of the two or more authentication servers.

Although this invention has been described in detail with reference to embodiments, variations and modifications exist within the scope and spirit of the invention as described and defined in the following claims.

The present application is based on Japanese Priority Application No. 2009-174612 filed Jul. 27, 2009, the entire contents of which are hereby incorporated by reference.

What is claimed is:

1. An information processing apparatus comprising:
a network interface configured to be connected to plural authentication apparatus, at least one image forming apparatus and at least one image management apparatus, the image forming apparatus requesting, to at least one of authentication apparatus, to authenticate a user based on input user authentication information and sending, to the information processing apparatus, image data and a request to execute workflow selected by the authenticated user, the workflow including one or more image processes and data distribution process to the at least one image management apparatus;
a workflow setting unit configured to store one or more workflow and set authentication method information identifying at least one of the authentication apparatuses selected from among the plural authentication apparatuses corresponding to workflow in a storage unit;
a request receiving unit configured to receive the request to execute workflow selected from among the stored workflow;
an authentication process unit configured to request, to the selected authentication apparatuses corresponding to the requested workflow in the storage unit, to authenticate the user based on the input user authentication information received from the image forming apparatus, and
a workflow control unit configured to control to execute the requested workflow based on authentication result by the authentication process unit when authentication method information corresponding to the requested workflow is set in the storage unit.

2. An information processing system in which plural authentication apparatuses, a information processing apparatus, and at least one image management apparatus are connected via a network, the information processing system comprising:
a workflow setting unit, at the information processing apparatus, configured to store one or more workflow and set authentication method information identifying at least one of the authentication apparatuses selected from among the plural authentication apparatuses corresponding to workflow in a storage unit, the workflow including one or more image process and data distribution process to the at least one image management apparatus;
a first authentication process unit, at the image forming apparatus, configured to request, to at least one of authentication apparatus, to authenticate a user based on input user authentication information;
a request unit, at the image forming apparatus, configured to send, to the information processing apparatus, the input user authentication information, image data and a request to execute workflow selected by the authenticated user;
a request receiving unit configured to receive the request to execute workflow selected from among the stored workflow;
a second authentication process unit, at the information processing apparatus, configured to request, to the selected authentication apparatuses corresponding to the requested workflow in the storage unit, to authenticate the user based on the input user authentication information received from the image forming apparatus, and
a workflow control unit, at the information processing apparatus, configured to control to execute the requested workflow based on authentication result by the authentication process unit when authentication method information corresponding to the requested workflow is set in the storage unit.

3. A method of operating an information processing apparatus connected to plural authentication apparatuses, the method comprising:
storing, by a workflow setting unit of the information processing apparatus, one or more workflows;
setting, by the workflow setting unit authentication method, information identifying at least one of the authentication apparatuses selected from among the plural authentication apparatuses corresponding to a workflow in a storage unit, the workflow including one or more image processes and a data distribution process corresponding to the at least one image management apparatus;
sending a request, from a first authentication process unit of the image forming apparatus to at least one of authentication apparatus, to authenticate a user based on input user authentication information;
sending, from a request unit of the image forming apparatus to the information processing apparatus, the input user authentication information, image data and a request to execute a workflow selected by the authenticated user;
receiving, at a request receiving unit, the request to execute a workflow selected from among the stored workflow;
sending a request, from a second authentication process unit of the information processing apparatus to the selected authentication apparatuses corresponding to the requested workflow in the storage unit, to authenticate the user based on the input user authentication information received from the image forming apparatus; and controlling, by a workflow control unit of the information processing apparatus, execution of the requested workflow based on an authentication result by the authentication process unit when authentication method information corresponding to the requested workflow is set in the storage unit.

* * * * *